Figure 1:
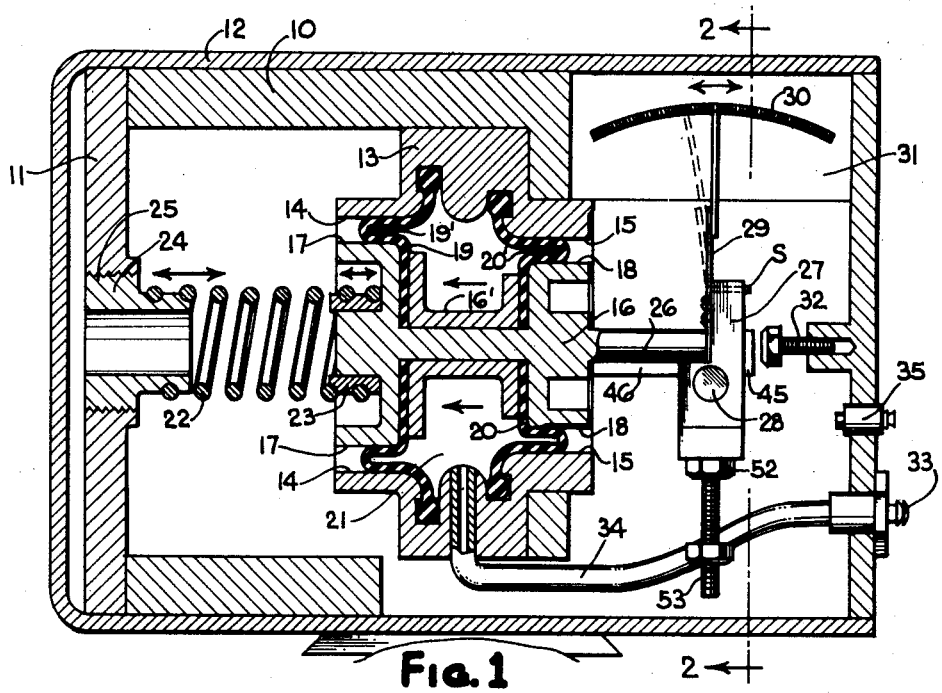

Nov. 24, 1959      H. D. NUNN      2,914,743

DOUBLE DIAPHRAGM PRESSURE TRANSDUCER

Filed April 23, 1958

INVENTOR.
HOWARD D. NUNN
BY Elliott & Pastoriza
ATTORNEYS

United States Patent Office 2,914,743
Patented Nov. 24, 1959

2,914,743

DOUBLE DIAPHRAGM PRESSURE TRANSDUCER

Howard D. Nunn, Manhattan Beach, Calif., assignor of one-half to Technology Instrument Corporation, a corporation of Massachusetts, and one-half to Robert W. Martin, San Fernando, Calif.

Application April 23, 1958, Serial No. 730,405

5 Claims. (Cl. 338—41)

This invention relates generally to pressure transducers and more particularly to an improved pressure measuring instrument capable of indicating with great accuracy extremely high pressures.

Conventional type pressure transducers employing capsules or cells generally include a flexible diaphragm wall which moves in response to variations in pressure. This movement in turn is transmitted through an actuating member to an electrical output system for providing a signal indicative of the degree of movement and thus the pressure change. It is very difficult to provide an accurate indication of high pressures with these types of units because of the very high strength required of conventional type diaphragms employed in such cells. If the diaphragm area is made relatively small in order to avoid the possibility of rupture, the movement thereof and thus the indication of pressure changes is correspondingly small. On the other hand, use of a large area diaphragm to provide a workable degree of movement of the actuating member subjects the cell to strains under high pressure which may well exceed the elastic limit of the diaphragm.

Bearing the above in mind, it is a primary object of the present invention to provide a novel pressure cell construction and design which will yield a relatively large movement for changes in very high pressures without undue strains in the diaphragms employed in the structure to the end that far greater accuracy in the indication of high pressures over what has been achieved heretofore is attainable.

Another object is to provide an improved pressure measuring instrument for high pressures of the above type incorporating in combination an output signal generating means providing a signal that is a function of such pressure.

Still another object is to provide in a device of the above type, adjusting means for altering the slope of the characteristic output curve by two different independent adjustments.

These and many other objects and advantages of the present invention are attained, briefly, by providing a pressure cell having open ends of different cross sectional area. A central plunger is co-axially disposed in the cell and provided with different sized end flanges positioned respectively within the end openings in a manner to leave a peripheral space. A pair of diaphragms are supported at their peripheral ends adjacent the inside of the two openings, respectively, and at their central portions adjacent the inside of the flanges on the central plunger. The diaphragms define a sealed volume therebetween constituting a pressure area. The diaphragms themselves include folded portions fitted within the space between the flanges and the open ends of the cell such as to accommodate small axial movements of the plunger back and forth in the cell. By making the diaphragms themselves perfectly flexible, substantially no friction is introduced when such movements of the plunger take place.

By the above described arrangement, the only actual area of the diaphragms upon which the pressure is acting without back support is that at the folded portions and this area may be made relatively small without sacrificing the degree of movement of the plunger in response to pressure changes. This movement, on the other hand, comes about as a consequence of the tendency for an increased pressure to maximize the volume between the diaphragms. Since the opposite ends of the cell are of different areas, movement of the plunger in one direction will tend to increase the volume while movement of the plunger in the other direction will tend to decrease the volume. The respective increase or decrease is very small for a relatively large movement of the plunger and thus a very accurate indication of pressure changes in the volume enclosed by the diaphragms may be indicated.

A biasing means in the form of a compression spring is arranged to bias the plunger in a direction to minimize the volume between the diaphragms and thus the pressure acts in opposition to this biasing means. By suitably coupling the plunger movements through an actuating member to a potentiometer wiper arm, an electrical output signal may be provided indicative of the pressure changes.

Figure 2:
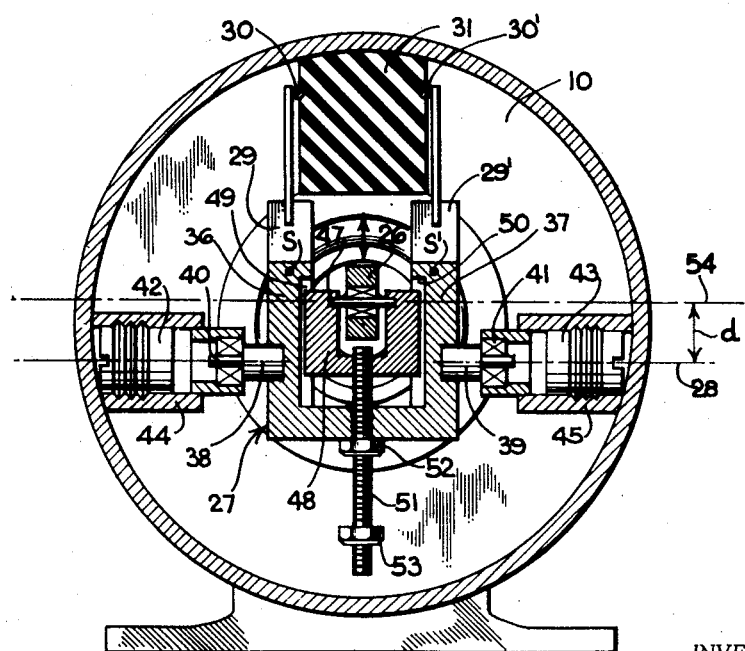

A better understanding of the invention will be had by referring to a preferred embodiment thereof as illustrated in the accompanying drawings, in which:

Figure 1 is an elevational cross sectional view of the double diaphragm high pressure transducer of the invention; and, Figure 2 is a cross sectional end view taken in the direction of the arrows 2—2 of Figure 1.

Referring first to Figure 1, there is illustrated a frame structure 10 including a front frame plate 11 and a housing 12 surrounding the frame. Supported at the midportion of the frame 10 is a pressure capsule 13 of annular shape having a horizontal center axis of symmetry and open cylindrical ends 14 and 15. As shown in Figure 1, the cylindrical end opening 14 is of larger diameter than the cylindrical end opening 15 and thus the open area of the left hand end of the pressure cell 13 is greater than the open area of the right hand end of the pressure cell.

A central plunger 16 is co-axially positioned in the cell 13 and includes enlarged diameter end flanges 17 and 18. The diameter of each of these flanges is slightly less than the inside diameter of the end openings 14 and 15, respectively, so that when the central plunger 16 is co-axially positioned within the cell 13, an annular space is defined between the opening 14 and outer flange surface 17 and the cylindrical opening 15 and outer flange surface 18 respectively at each end of the cell.

A pair of diaphragms 19 and 20 are secured at their outer peripheral ends adjacent the inside portion of the cylindrical ends 14 and 15, respectively, and at their central portions to the central plunger 16 as by a spool type sleeve member 16'. The diaphragms themselves are extremely flexible and are positioned with oppositely directed annular folds 19' and 20', respectively, positioned in the annular spaces at the two ends of the cell. By this arrangement, the central plunger 16 may move back and forth through short axial distances, such movement being accommodated by the folded portions of the diaphragms and thus a pressure tight chamber 21 is maintained throughout such movements. It will also be evident as a consequence of the above construction that movement of the central plunger 16 to the left as indicated by the arrows will increase the total volume between the diaphragms in the chamber 21 and thus any build up of pressure in this chamber will tend to maximize the volume and thus move the central plunger to the left. The increase in volume as a result of this movement is directly attributable to the larger area of the left hand end of the cell as compared to the right hand end.

As shown in Figure 1, there is provided a biasing means in the form of a compression spring 22 connected between the frame plate 11 and left hand end of the plunger 16 to apply a biasing force opposing the tendency of the plunger to move to the left under pressure. In accordance with an important feature of the invention, the right hand end of the spring 22 has its end turns passing about a sleeve member 23 slidable on the hub of the central plunger 16 and its left hand end turns passing about a threaded positioning screw 24 received in the front plate 11. By this arrangement, with several turns of each end of the compression spring 22 wound about the sleeve and positioning screw, it is possible by threading the positioning screw 24 in the threaded opening 25 of the front plate 11 to vary the effective length of the spring 22 by simply unthreading some of the end coils from the screw. The same effective variation in the length of the spring 22 may also be effected by unthreading some of the end coils of the spring from the sleeve member 23. By varying this effective length, the total spring constant of the spring is effectively changed. It is also possible with the above described arrangement, to thread the positioning screw 24 outwardly, that is, to the right and simultaneously permit the sleeve 23 to rotate about the hub on the left hand end of the central plunger 16 thereby effectively moving the entire plunger further to the right without changing the effective length of the spring. The purpose for providing these various adjustments will become clearer as the description proceeds.

The right hand end of the central plunger 16 connects to an actuating member 26 pivoted to a wiper arm support 27 in turn pivotally mounted for rotation to the frame 10 about an axis 28. As shown, the wiper arm support 27 supports a wiper arm 29 having a contact head adapted to engage an arcuate resistance element 30 supported to a support block 31 secured to the frame.

The extreme right hand end of the frame may include a stop screw 32 arranged to engage the wiper arm support 27 when it is arcuately swung to the right and thus prevent the wiper arm 29 from passing off of the arcuate resistance 30. High pressures to be measured may be communicated to the interior 21 of the pressure cell 13 through an inlet nipple 33 and conduit 34. A second nipple 35 may be provided for evacuating the enclosure within the housing 12 or introducing an inert gas or other pressure in the event the differential pressure appearing at the nipples 33 and 35 is to be measured.

A preferred means for coupling the actuating member 26 to the wiper arm support 27 is best illustrated in Figure 2 wherein it will be noted that the wiper arm support 27 is in the form of a yoke member having two upstanding yoke arms 36 and 37. Journal shaft supports 38 and 39 extend in opposite directions from these arms and terminate in reduced diameter journals received within suitable journal bearings 40 and 41. The journal bearings 40 and 41 are respectively supported by bearing support screws 42 and 43 threaded within receiving sockets 44 and 45 mounted to the frame 10. One of the mounts for the supporting socket 45 is illustrated at 46 in Figure 1.

The free end of the actuating member 26 is received between the yoke arms 36 and 37 and receives a journal shaft 47 supported by a second yoke structure 48 mounted for sliding movement within the yoke 27 along vertical guideways 49 and 50. An adjusting screw 51 is secured to the lower end of the second yoke 48 and passes through a threaded opening in the bottom of the yoke 27. A suitable lock nut 52 may be provided adjacent the exit point of the screw 51 from the lower end of the yoke 27 and further down on the screw there may be provided a counterweight nut 53 for statically balancing the wiper arm support yoke 27 about its pivot axis 28.

From the arrangement described, it will be noted that pivoting action of the free end of the actuating member 26 takes place about an axis 54 spaced a distance "d" from the axis 28.

In the particular embodiment illustrated in Figures 1 and 2, a dual output is provided in the form of a second wiper arm 29' secured to the yoke arm 37 having a contact head arranged to engage a second arcuate resistance element 30' secured to the support 31.

The operation of the pressure transducer will be evident from the above description. When the pressure within the interior 21 of the cell 13 between the diaphragms 19 and 20 increases, the central plunger 16 will tend to move in a direction to maximize the interior volume 21. This direction as indicated by the arrows is to the left and will thus act against the compression spring 22. The movement to the left will be transferred to the wiper arm support 27 through the actuating member 26 to rotate the member 27 in a counter clockwise direction or to the left causing a contact point on the resistance element 30 to vary. If a constant potential is applied across the entire resistance element 30, the voltage picked off by the contact head 29 will be a function of its position thereon and may serve as an output signal indicative of the pressure within the cell 13. The potential source and electrical connections are not shown inasmuch as such pick-offs are well known in the art and form no part of the present invention.

If a decrease in pressure in the interior 21 of the pressure cell 13 occurs, the compression spring 22 will urge the central plunger 16 to the right in a direction to minimize its volume and thus move the actuating member 26 to the right rotating the wiper arm support 27 in a clockwise direction. This motion in turn will cause the wiper arm 29 to move to the right over the resistance element 30 and provide a changed electrical signal indicative of this decrease in pressure.

As mentioned heretofore, the diaphragms 19 and 20 are made of extremely flexible material. The total area actually exposed to the pressure differential between the interior 21 of the pressure cell 13 and exterior thereof, is only at the folded portions 19' and 20'. The remaining major portions of the diaphragms are suitably supported and backed by the flanges 17 and 18 and the central spool 16'. Since the effective areas of the diaphragms are relatively small, the required degree of flexibility may be provided notwithstanding extremely high pressures are introduced into the pressure cell. On the other hand, the fact that only a small effective area of the diaphragms is employed does not result in small movement of the central plunger 16. On the contrary, a relatively large movement of the central plunger 16 will take place for very minute changes in the pressure inasmuch as a marked degree of movement is necessary to appreciably change the interior volume of the cell. The actual degree of this movement to alter the interior volume may be controlled by carefully predetermining the difference in the areas of the left and right hand sides of the cell end openings and plunger and flanges respectively.

From the above description of the operation, it will now be evident that the various adjustments described with respect to the spring 22 may be effectively employed for varying the characteristics of the output curve. For example, by changing the effective length of the spring 22 as described heretofore, its spring constant is effectively changed and thus the slope of the output characteristic curve is altered. The slope of the output characteristic may also be changed by varying the spacing between the pivotal axis 54 with respect to the pivotal axis 28 as by threading of the screw 51 of Figure 2.

In the event it is desired simply to change the point of intercept of the output characteristic curve, both the sleeve 23 and positioning screw 24 may be rotated simultaneously with the spring while the latter positioning screw is moved in and out of the threaded opening 25 thus positioning the central plunger 16 closer to or further from the pivot axis 28 of wiper arm 27. This movement is effected while the interior portion of the cell is exposed to the atmosphere so that no changes in the pressure between the diaphragms will take place. Accordingly, the starting point of the contact head 29 on the resistance element 30 may be properly adjusted without having to physically move the resistance element itself.

In the dual electrical output structure illustrated in Figure 2, suitable phasing between the outputs with respect to the resistance elements 30 and 30' may be effected as by the small screws S and S' arranged to flex the wiper arms as indicated at dotted lines and the double headed arrow in Figure 1. By independently adjusting each wiper arm, their contact positions on the arcuate resistance elements 30 and 30' may be made to correspond without affecting any of the other adjustments.

The provision of bearing supports such as indicated at 42 and 43 for the bearings 40 and 41 in Figure 2 enables radial play to be removed from the pivotal mounting of the wiper arm support 27. Thus, by threading the bearing supports 42 and 43 in their support sockets 44 and 45, the bearings 40 and 41 will be urged against the annular shoulders defined between the journal shaft supports 38 and 39 and reduced diameter journal shafts.

From the foregoing description, it will be seen that the present invention provides a greatly improved pressure transducer in which extremely high pressures may be indicated. Further, the various adjustments described in combination with the high pressure transducer render it capable of continued accuracy throughout its life. Changes and modifications will readily occur to those skilled in the art. The high pressure transducer is, therefore, not to be thought of as limited to the specific example chosen for illustrative purposes.

What is claimed is:

1. A pressure transducer comprising, in combination: a frame; a pressure cell having open ends of different areas supported in said frame; a central plunger having end flanges of different areas respectively smaller than said open ends and positioned centrally within said open ends to leave peripheral spaces; flexible diaphragm members having their peripheries secured adjacent the insides of said open ends respectively and their central portions secured adjacent the insides of said flanges, said diaphragm members including folded portions received in said peripheral spaces to accommodate axial movement of said central plunger, whereby an increase in pressure in said cell will move said plunger in a direction to maximize the volume of said cell between said diaphragms; biasing means urging said plunger in a direction to minimize said volume; and means connected to said plunger responsive to movement thereof to provide a signal indicative of pressure changes in said cell.

2. A pressure transducer comprising: a frame; a pressure cell having open cylindrical ends of different diameters supported in said frame; a central plunger having annular end flanges co-axially disposed within said cylindrical ends respectively to leave annular spaces; flexible diaphragm members annularly secured adjacent to the inside peripheries of said cylindrical ends of said cell and including oppositely directed annular folds projecting into said annular spaces respectively; bias means connected between one end of said plunger and said frame; a wiper arm pivotally mounted for rotation to said frame about a first axis; an actuating member connected at one end to the other end of said plunger, the other end of said actuating member being pivoted to said wiper arm for rotation about a second axis parallel to and spaced from said first axis; and a resistance element secured to said frame with which said wiper arm is in wiping engagement whereby an increase in pressure in said cell will move said plunger in a direction to increase the enclosed volume in said cell to move said wiper arm.

3. A pressure transducer according to claim 2, including means connected to said wiper arm for varying the distance between said first and second axes.

4. A pressure transducer according to claim 2, in which said bias means comprises a spring co-axially aligned with said central plunger; a positioning screw receiving the end turns of one end of said spring and threaded on said frame for axial movement towards and away from said plunger; and a sleeve member axially movable on said one end of said plunger receiving the end turns of the other end of said spring whereby the effective length of said spring may be varied by uncoiling certain of said end turns.

5. A pressure transducer according to claim 2, including a housing hermetically sealing said frame; and means for communicating a pressure from the exterior of said housing to the interior of said pressure cell.

References Cited in the file of this patent

UNITED STATES PATENTS

| 2,384,894 | Curtis | Sept. 18, 1945 |
| 2,724,760 | Giannini | Nov. 22, 1955 |
| 2,811,619 | Bourns et al. | Oct. 29, 1957 |